United States Patent [19] [11] 4,182,560
Oguchi et al. [45] Jan. 8, 1980

[54] COLOR PRINTING METHOD

[75] Inventors: Masanobu Oguchi; Hidehiko Ishikawa; Haruyoski Okuyama, all of Nihonbashi-Muro; Yasuo Uchida, Hachioji; Kiyoshi Izawa, Hino, all of Japan

[73] Assignee: Konishiroku Photo Industry Co. Ltd., Japan

[21] Appl. No.: 895,441

[22] Filed: Apr. 11, 1978

Related U.S. Application Data

[62] Division of Ser. No. 701,018, Jun. 30, 1976, abandoned.

[30] Foreign Application Priority Data

Jul. 23, 1975 [JP] Japan .................................. 50-90479

[51] Int. Cl.² ...................... G03B 17/24; G03B 27/76; G03B 27/32
[52] U.S. Cl. ..................... 354/106; 355/35; 355/77
[58] Field of Search ....................... 355/32, 35, 67, 71, 355/77; 354/105, 106, 270

[56] References Cited

U.S. PATENT DOCUMENTS

| 1,848,814 | 3/1932 | Allen | 354/106 |
| 3,577,898 | 5/1971 | Bragg | 355/71 X |
| 3,718,074 | 2/1973 | Davis | 355/35 UX |
| 3,765,754 | 10/1973 | Winkler | 354/105 X |
| 3,901,598 | 8/1975 | Vanheerentals | 355/71 |
| 4,001,850 | 1/1977 | Fujita | 354/106 X |

FOREIGN PATENT DOCUMENTS

| 16989 | 2/1956 | Fed. Rep. of Germany | 354/105 |
| 591695 | 8/1947 | United Kingdom | 354/106 |

Primary Examiner—Donald A. Griffin
Attorney, Agent, or Firm—Bruce L. Adams; Emmanuel J. Lobato; Rober E. Burns

[57] ABSTRACT

In a color printing method, a color photosensitive material is exposed in the photographing step to object illuminating light, which is recorded thereon as an optical density by photographic treatments. In the printing step, the optical density is detected to determine blue, green and red exposures, which cause the object illuminating light to be reproduced on a color positive photosensitive material so as to have neutral gray or to be colored to a standard color. An object image on the color photosensitive material is printed on the color positive photosensitive material with the most suitable color reproduction with the same three-color component exposures as those determined in printing the object illuminating light.

6 Claims, 5 Drawing Figures

COLOR PRINTING METHOD

This is a divisional of application Ser. No. 701,018, filed June 30, 1976 now abandoned.

BACKGROUND OF THE INVENTION

1. Field of the Invention

This invention relates to a color printing method, and more particularly to a color printing method in which primary object illuminating light is guided for exposure to a color film, which is also exposed to object image forming light, and then recorded thereon to produce an optical density after the color film has been developed, the optical density being used to determine blue, green and red exposures for the picture frame carrying the object image when the color print is intended to be produced with a color positive photosensitive material.

2. Description of the Prior Arts

The description will first be given to a method, which has been put to practical use to mass-produce color prints, for producing color positive pictures from color negatives on a color photographic paper by means of a full-correction type automatic color printer.

This automatic color printer operates according to a method "Integrating to Gray" proposed by Evans. In this method, three colors (blue, green, red) all over a picture on the color negative are measured to obtain their optical density, on the basis of which three color lights, to which a positive photosensitive material is exposed, are determined so that the three color lights may be equal to one another on the color positive photosensitive material, that is, they become thereon a neutral gray. In other words, the automatic color printer using the Integrating to Gray has its exposure conditions so determined that a proper color print can be obtained from a standard color negative. The proper color print can, however, not be obtained from negatives having color failure and/or density failure, particularly from the following negatives:

(1) a color negative obtained by photographing under a light source having a color temperature different from that of a light source by which the standard color negative is produced;

(2) a color negative film differing greatly from the standard color negative in three-color density composition; and (3) a color negative film differing greatly from the standard color negative in desity distribution, particularly in color density distribution.

The printing from the color negative having such color failure and/or density failures with the aid of the Integrating to Gray results in the production of a positive print whose color and/or density are out of balance.

In this respect, the full-correction type automatic color printer is typically provided with color correcting buttons, density correcting buttons or the like for conducting correction such as low-ward correction or slope control in oder to also obtain a proper color print from the above-mentioned color negative having the color failure and/or density failure.

Recently, a terminal device is further partially utilized, in which the color negative is divided in small units for density measurement to determine the exposure conditions in cooperation with a computer. Such an automatic printer and its terminal device are, however, very complicated in structure and sophisticated in operations, and produces a color print whose quality and yield have not been so satisfactory as expected.

There is, on the other hand, another method in which a gray scale is disposed at an object in the photographing step and recorded on the color film together with the object. In this case, the exposure conditions in the automatic color printer are so determined that the gray scale can be reproduced on the color print with non-coloration, i.e., gray while the object can be reproduced with the most suitable density. This method makes it possible to obtain the proper color print of all the objects so far as the gray scale can be photographed together with the object and the density of the gray scale can be detected to determine an amount of exposure.

In practice, however, it is impossible to put this method to practical use, because no common photographer generally disposes the gray scale at the object in the photographing step.

SUMMARY OF THE PRESENT INVENTION

An object of the present invention is to eliminate the above-mentioned drawbacks in the conventional printing method.

More specifically, an object of the present invention is to provide a printing method capable of producing positive prints with high quality not only from a standard negative but from a negative suffering from color failure and/or density failure.

A further object of the present invention is to provide a printing method capable of easily producing positive prints with high quality without using complicated correcting means.

The above-mentioned objects can be achieved by a printing method comprising a step of exposing a color photosensitive material to object image forming light and object illuminating light, a step of treating said color photosensitive material photographically to produce thereon a picture having a recording portion on which the object illuminating light is recorded, and a step of conducting exposure correction at the time of printing on the basis of a photographic density on said recording portion and obtaining a positive print from said color photosensitive material.

DETAILED DESCRIPTION OF PREFERRED EMBODIMENTS

In the following, the present invention will be described in detail.

For example, on the front or top surface of a camera there is disposed a semispherical and non-directional light receiving portion made of plastics, which are semi-transparent to light in the photosensitive wavelength region (ranging from about 380 to 700 mm) of a color film and diffuse the light. Light incident on the light receiving portion is guided to the film surface by means of a light guide such as an optical fiber, optical tube or the like. The light thus introduced to the film surface indeed containes the light reflected from the object, but its portion is very small, and for the most part it contains the object illuminating light in view of the fact that the light receiving portion is constructed to be non-directional. The light guided by the light guide is interrupted by a shutter which interlocks with a shutter serving to pass the object image forming light. When the latter shutter is made open to perform image-wise exposure, the former shutter opens to expose the film to the light which has passed through the light guide.

It is preferable that, in a camera with an adjustable stop, a light adjuster cooperating with the stop should be provided in a light path including the light guide to adjust the object illuminating light to an amount corresponding to the light which has passed through a photographing objective and the stop so that the film may be exposed to the adjusted object illuminating light.

Thus, the film is exposed to the light having the intensity proportional to the intensity of the object illuminating light and the area of the stop's aperture and having a special distribution equal to that of the object illuminating light. It is to be noted that the transmittance density of three colors, blue, green and red, obtained by exposing the film to the object illuminating light and developing the film should lie on the straight line portion of characteristic curve of the film. For this purpose, a stop, ND filter or reflector may be provided in the light path between the light receiving portion and the film to adjust an amount of light reaching the film.

Thus, the color film on which the object image as well as the object illuminating light are recorded undergoes well-known photographic treatments such as developing, washing or the like to produce a negative.

In the printing case, a color positive photosensitive material is exposed to light through the negative image on the film. Such an exposure may be conducted using any one of known methods such as additive color process, subtractive color process, simultaneously exposing process and sequentially exposing process. The exposures for the three color components, blue, green and red, are determined so as to cause the illuminating light density on the recording portion to be reproduced on a positive print with a predetermined color density, for example, with neutral gray. In a practical printing process, the above-mentioned determination of the exposures is carried out as follows: the amount of light passing through the recording portion is first measured for every three-color component. The printing exposures for the three color components are then determined on the basis of this measurement. These exposures are such those by which the illuminating light density of the recording portion can be reproduced on the color positive photosensitive material with a predetermined color density as mentioned above. This process is repeated for several successive recording portions on the negative to determine the three color printing exposures. Each of the object images on the negtive is next printed on the color positive photosensitive material with the same three color component exposures as those determined in printing the illuminating light density.

Alternatively, the three color component exposures may be determined for every object image on the negative on the basis of the corresponding recording portion.

As mentioned above, the exposure conditions in the full-correction type automatic color printer is so set that the illuminating light density on the color film may be reproduced on the positive photosensitive material with the neutral gray. These exposures are also determined so that the object image may be reproduced thereon with the most suitable density. The full-corrosion type automatic color printer with its exposure conditions determined as mentioned above, therefore, make it possible to expose the color positive photosensitive material most suitably from all the color films with the illuminating light density recorded thereon without any influence by a photographing light source or color distribution of the object with the result that the color print is obtained with the most suitable color reproduction.

In the case of a color film having an excessive or insufficient exposure in comparison with a color film having a proper exposure or different quality, the densities of three colors, blue, green and red for the object illuminating light are out of balance, deviating from those in the proper exposure, so that the most suitable exposure cannot be possibly given to the color positive photosensitive material in the printing and no color print can be produced with the most suitable color reproduction. In such a case, a proposal may be made in which a control circuit such as a known slope control provided in the automatic color printer should be provided in the exposure controlling circuit of the full-correction type automatic color printer.

The most important feature of the present invention resides in that the exposure correction to be conducted at the time of printing is influenced primarily by the object illuminating light, but hardly by the light reflected from the object. For example, a human skin, which has a moderate reflection factor, can be reproduced on the color positive film as having a moderate density and a favourable hue without any influence of brightness in the background even if the brightness is relatively high or law because the exposure correction in the printing step is based on the illumination light density, but not on the density of the object image on the negative. Even if, on the other hand, a tungsten or fluorescent lamp having a color temperature deviating from that of the daylight is used as a light source, the influence due to the color temperature of such a light source can be corrected, so that a clear positive print can be obtained.

It is a photographic fundamental that a standard object having brightness equal for each of primary three color components should be reproduced on the color print so that the integrating of three colors of its picture may lead to the formation of gray or non-coloration. However, the preference sometimes occurs either to cool or hot color reproduction depending upon race or nationality. In this respect, the condition of non-colored reproduction on the color print may be modified so that the coloration to be reproduced deviates to a preferred color tone.

Further, an improper color negative film results from an inadequate developing treatment, reciprocity law failure, latent image degradation by storage, etc., The improper film is, for example, a color film having its green component density reduced due to the irregularity of the developing treatment in comparison with the color film subjected to the standard treatment. In such a color film, the reduction of the negative picture in green component can be corrected automatically by the exposure correction using the illuminating light density according to the present invention with the proper positive print being obtained because the illuminating light density on such a color film also has its green component density reduced.

It is to be noted that either color negative film or color reversal film may be used as the color film, a color paper for color negative film or color positive film may be used as the printing photosensitive material, and a color reversal paper or color reversal film may be used to print a slide.

The present invention will next be described by way of preferred embodiments in conjunction with the accompanying drawings in which.

Figure 1:
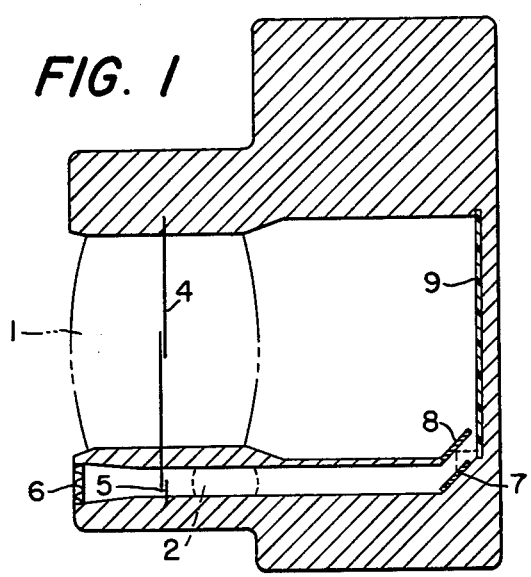
FIG. 1 is a cross-section showing one embodiment of a structure for exposing a film to object illuminating light according to the present invention.

In FIG. 1, a diffuser 6 provided in association with a photographing objective 1 serves to receive object illuminating light. The light incident on the diffuser 6 is guided to a film 9 through a lens 2 and mirrors 7, 8. A shutter 5 interlocks with a photographing shutter 4, and is opened to expose the film 9 to the object illuminating light when the shutter 4 is made open to expose the film 9 to the object image forming light.

Figure 2:
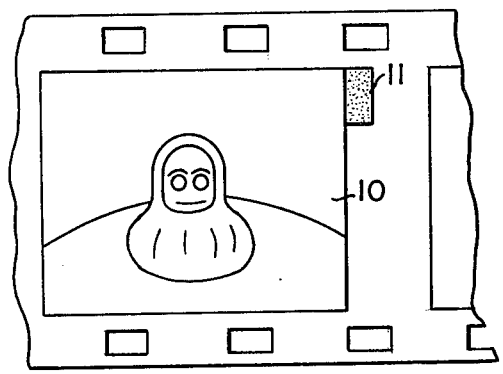
FIG. 2 is a schematic view showing a picture frame of a color film on which an object and a recording portion are photographed.

FIG. 2 shows a picture thus photographed and treated photographically by the use of a known method. A picture 10 has on its margin a recording portion 11, on which the object illuminating light is recorded. The printing is carried out using the thus obtained negative picture with the aid of a method of successive exposure to blue, green, and red light or a method of simultaneous exposure to three color lights. In this case, the intensity of each component of the three color lights is so adjusted that the potion 11 on which the object illuminating light is recorded may be reproduced to be neutral gray. Such a printing method makes possible the production of a proper and clear positive print.

Figure 3:
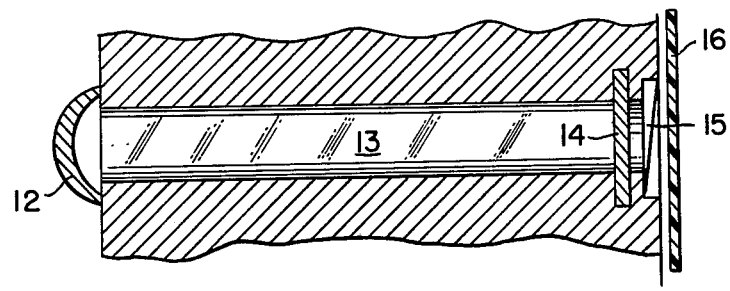
FIG. 3 is a schematic cross-section showing another embodiment of an arrangement for exposing the film to the object illuminating light.
Figure 4:
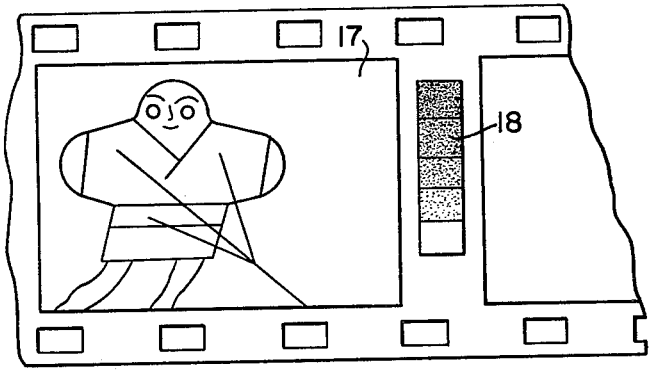
FIG. 4 is a schematic view showing a picture frame of the color film obtained by the arrangement in FIG. 3.

In an embodiment as shown in FIG. 3, a semispherical diffuser 12 is provided on the front surface of the camera body to guide light incoming on the diffuser 12 to a shutter 14 of a camera through a light guide 13 made of glass block. An optical wedge 15 is disposed between the shutter 14 and a film 16. In the photographing, the shutter 14 is made open to pass the object illuminating light through the optical wedge 15 to the film 16. In this embodiment, the use of the optical wedge allows the production of a colored recording portion on the film, which has various densities ranging from zero to a maximum as shown in FIG. 4. Even for very strong object illuminating light, therefore, the most suitable middle density can be selected to conduct the exposure correction at the time of printing. This embodiment is advantageous in a camera having no automatically or manually adjustable stop.

Figure 5:
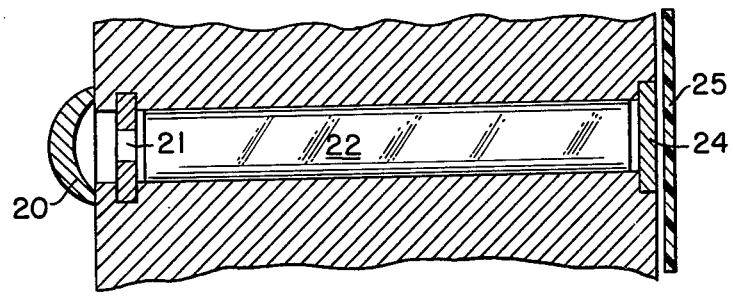
FIG. 5 is a schematic cross-section showing another embodiment of an arrangement for exposing the film to the object illuminating light.

In an embodiment in FIG. 5, a semispherical diffuser 20 is provided on the front surface of the camera body to guide the object illuminating light to a film 25 through a light guide 22. A shutter 24 is provided between the light guide 22 and the film 25. The shutter 24 may also serve to pass or interrupt the object image forming light or may be constructed so as to interlock with another shutter for passing or interrupting the object image forming light. In this embodiment, an adjustable stop 21 is provided between the diffuser 20 and the light guide 22. This stop interlocks with another adjustable stop for adjusting the object image forming light passing therethrough. The last-mentioned adjustable stop may be any one of known stops such as a stop controlled by an automatic exposure control mechanism or a stop controlled by a manually adjustable mechanism.

What is claimed is:

1. A camera for taking photographs, comprising, means for holding a photosensitive color film having at least one frame for effecting a photographic exposure thereon and a record portion in the proximity of said frame to record brightness of the ambient light in the field of the exposure during the taking of the exposure, said record portion being measurable with respect to its color density and reproduced to be a neutral gray in printing a color positive print from said negative, light-transmitting means for transmitting ambient light from the field of exposure to said record portion, said camera having a shutter for effecting the taking of said exposure, said light-transmitting means comprises a light-guide to transmit the ambient light to record the brilliance, and light-adjusting means to vary the ambient light transmitted through said light-guide.

2. A camera for taking photographs according to claim 1, in which light-adjusting means comprises another shutter in said light-guide operated in synchronism with the first-mentioned shutter.

3. A camera for taking photographs according to claim 1, in which said light-adjusting means comprises an otpical wedge.

4. A camera for taking photographs according to claim 1, in which said light-transmitting means comprises means defining a light path, and a lens in said light path.

5. A camera for taking photographs according to claim 1, in which said light-transmitting means comprises a glass rod.

6. A camera for taking photographs according to claim 1, in which said light-transmitting means comprises means defining a light passageway, and a diffuser for receiving said light and transmitting it through said passageway.

* * * * *